(12) United States Patent
Brunner (10) Patent No.: US 11,213,941 B2
(45) Date of Patent: Jan. 4, 2022

(54) TOOL BOX

(71) Applicant: Keter Plastic Ltd., Herzliya (IL)

(72) Inventor: Yaron Brunner, Kibbutz Gvat (IL)

(73) Assignee: Keter Plastic Ltd., Herzliya (IL)

( * ) Notice: Subject to any disclaimer, the term of this patent is extended or adjusted under 35 U.S.C. 154(b) by 619 days.

(21) Appl. No.: 16/077,863

(22) PCT Filed: Mar. 1, 2017

(86) PCT No.: PCT/IL2017/050260
§ 371 (c)(1),
(2) Date: Aug. 14, 2018

(87) PCT Pub. No.: WO2017/149539
PCT Pub. Date: Sep. 8, 2017

(65) Prior Publication Data
US 2021/0187725 A1    Jun. 24, 2021

Related U.S. Application Data

(60) Provisional application No. 62/303,477, filed on Mar. 4, 2016.

(51) Int. Cl.
*B25H 3/02* (2006.01)
*B62B 1/22* (2006.01)

(52) U.S. Cl.
CPC .............. *B25H 3/023* (2013.01); *B62B 1/22* (2013.01)

(58) Field of Classification Search
CPC ........ B25H 3/023; B25H 3/027; B25H 3/028; B25H 3/00; B25H 3/02; B62B 1/22; B29C 49/4802; B29C 49/22; B65D 1/0215
USPC ............................... 220/254.3; 206/373, 372
See application file for complete search history.

(56) References Cited

U.S. PATENT DOCUMENTS

| | | | |
|---|---|---|---|
| 2,361,079 A | 10/1944 | Berry | |
| 5,873,463 A | 2/1999 | Purcell | |
| 6,832,689 B2* | 12/2004 | Cho | B25H 3/023 206/372 |
| D649,349 S | 11/2011 | Chen et al. | |
| 2012/0292213 A1* | 11/2012 | Brunner | B25H 3/028 206/349 |
| 2012/0326406 A1* | 12/2012 | Lifshitz | B25H 3/02 280/47.19 |

FOREIGN PATENT DOCUMENTS

| | | |
|---|---|---|
| CA | 2 483 132 A1 | 3/2006 |
| CN | 201693540 U | 1/2011 |
| CN | 102712090 A | 10/2012 |
| WO | 2011/089598 A2 | 7/2011 |
| WO | WO-2015158267 A1 * 10/2015 | ............... G02B 6/44 |

\* cited by examiner

*Primary Examiner* — King M Chu
(74) *Attorney, Agent, or Firm* — Vorys, Sater, Seymour and Pease LLP; William L. Klima (57) ABSTRACT

Provided is a toolbox with a base container, at least two covers displaceable over the top opening of the base container and at least two locking arrangements extending at an upper portion of the base container.

18 Claims, 8 Drawing Sheets

ND 1
TOOL BOX

TECHNOLOGICAL FIELD

This disclosed subject matter relates to a tool box, and more particularly it is concerned with a transportable tool box.

BACKGROUND ART

References considered to be relevant as background to the presently disclosed subject matter are listed below:
WO 2011/089598
Acknowledgement of the above reference herein is not to be inferred as meaning that this is in any way relevant to the patentability of the presently disclosed subject matter.

BACKGROUND

Various types of tool boxes are known in the art. One such box is disclosed in WO 2011/089598 directed to a transportable tool box comprising a large compartment configured with upright extending side walls defining a top opening of the large compartment configured with a locomotive arrangement, and two compartmented covers slidingly displaceable over the top opening of the large compartment between a closed position wherein the covers coextend and cover the top opening, and an open position wherein the two covers are displaced away from one another and expose the large compartment to allow access thereto. A locking arrangement is provided for arresting the compartmented covers at the closed position.

GENERAL DESCRIPTION

The disclosed subject matter is concerned with a tool box comprising:
  a base container having a base portion and configured with upright extending side walls defining a top opening of the base container, together defining the container interior;
  at least two covers displaceable over the top opening of the base container between a closed position wherein the at least two covers coextend and cover the top opening, and an open position wherein at least one of the at least two covers is displaced away from an at least one other cover and at least partially exposes the containers' interior to allow access thereto, each cover of the at least two covers comprising a free edge and a mating edge; and
  at least two locking arrangements extending at an upper portion of the base container, each configured for locking at least one of the at least two covers at respective mating edges, at least with respect to the base container.

In accordance with an aspect of the disclosed subject matter there is disclosed a transportable tool box comprising:
  a base container having a base portion and configured with upright extending side walls defining a top opening of the base container, together defining the container interior;
  at least two covers displaceable over the top opening of the base container between a closed position wherein the at least two covers coextend and cover the top opening, and an open position wherein at least one of the at least two covers is displaced away from an at least one other cover and at least partially exposes the containers' interior to allow access thereto, each cover of the at least two covers comprising a free edge and a mating edge;
  locomotive arrangement disposed toward a lower portion of said container assembly;
  at least one handle for transporting said transportable box on said locomotive arrangement; and
  at least two locking arrangements extending at an upper portion of the base container, each configured for locking at least one of the at least two covers at respective mating edges, at least with respect to the base container.

The term compartmented cover as used hereinafter in the specification denotes a an element serving both as a cover for the base container and configured with a storage compartment which may be further divided either fixedly or modularly, i.e. by bins or partition walls or combinations thereof.

Any one or more of the following features and design may be applied in connection with the tool box according to the present disclosed subject matter:
  The covers are displaceable by a rail system fitted at the top edges of the base container;
  The covers are displaceable by a parallel link type mechanism, linking each of the covers to the base container;
  The covers are slidably secured to the base container by a pair of drawer-type slides, facilitating firm support of the compartmented covers also at the fully open position;
  The locomotive arrangement comprises at least one pair of wheels fitted near or at a bottom of the base container and a manipulating handle articulated with the base container;
  At the closed position the covers mate about a center of the base container;
  At the open position the covers are fully displaceable from the top opening of the base container, to thereby facilitate full access to its interior;
  The locking arrangement is a latch, and in accordance with yet an example it is a toggle latch type arrangement;
  The covers are compartmented covers, optionally provided with lids covering storage compartments therein. According to one configuration the respective lids are locked when the compartmented covers are at the closed position;
  At least one, at times all, of the locking arrangements is configured for receiving a lock to prevent unauthorized opening of the tool box and access to its compartments or interior;
  The handle is manipulable between a stowed position and a locomoting position, in which it extends from the tool box to facilitate its locomotion;
  The handle is slidably displaceable between the stowed (retracted) position in which it substantially blends with the base container, and the locomotive (extracted) position in which it facilitates manipulating (pulling/pushing) of the tool box in a cart like position;
  A pair of wheels is provided at a bottom side edge of the base container (articulated to either the base or a bottom portion of the side wall), and the handle is extractable from an opposite top side edge of the base container. According to one design, the handle comprises two side arms interconnected by a grip portion, wherein the side arms are slidably retained along respective top front and rear edges of the base container, and wherein the grip portion is substantially parallel to the respective top side edge such that at the retracted position it is flush with the base container;
  Each cover can be locked independently an separately by a locking arrangement;

The locking arrangement comprises two locking mechanisms provide one opposite the other at the mating edges of the covers, when in the closed position;

The cover members are further lockable at their top surface one respective the other;

At least one of the covers is provided at its mating edge with an elastic seal.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which.

In order to understand the disclosed subject matter and to see how it may be carried out in practice, embodiments will now be described, by way of a non-limiting example only, with reference to the accompanying drawings, in which.

DETAILED DESCRIPTION OF EMBODIMENTS

With reference to the accompanying drawings, there is illustrated a transportable tool box generally designated 10, comprising a basin-like base container 14 configured with a bottom base 16 from which four substantially upright side walls 18 extend, defining by their top edges 20 a top opening of the base container 14.

Figure 1A:
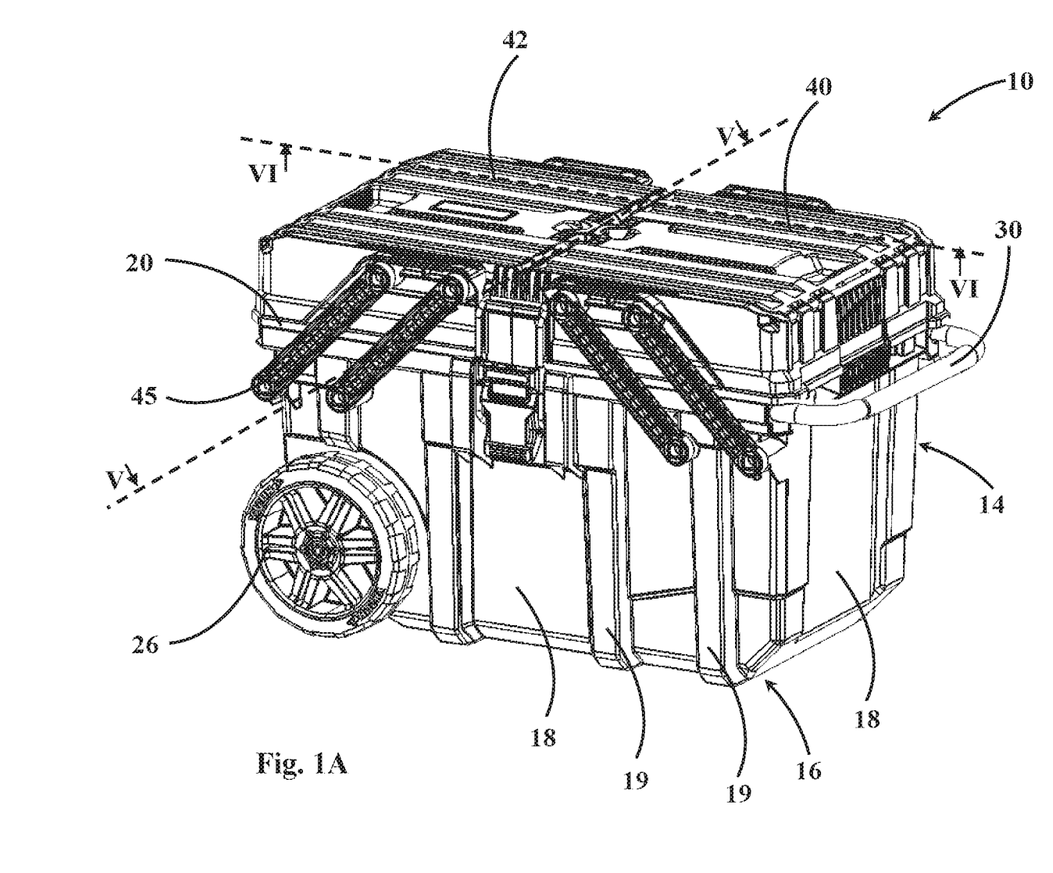
FIG. 1A is a perspective view of a tool box in accordance with the present disclosed subject matter, with the tool box in its closed position and the transportation handle in its retracted position.
Figure 1B:
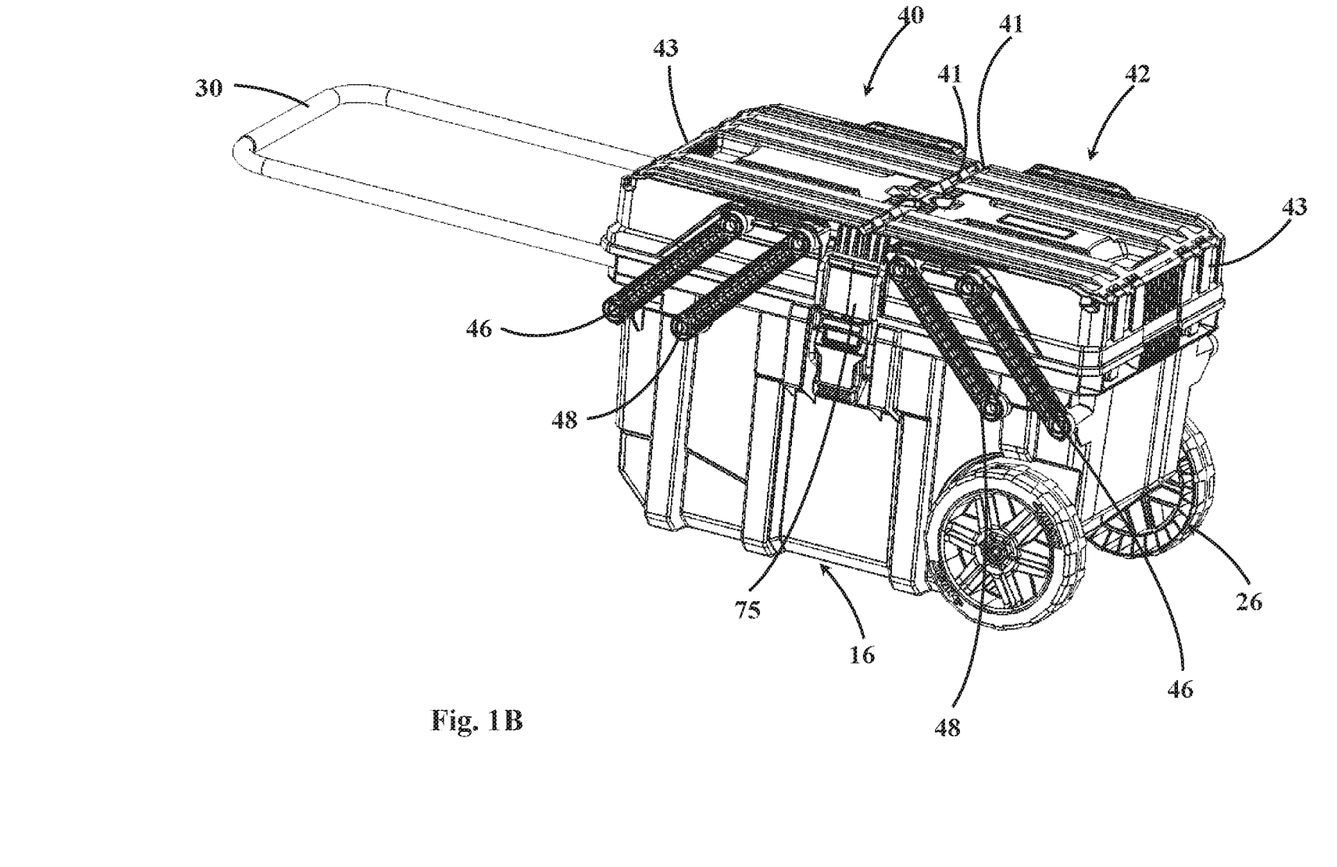
FIG. 1B is another perspective view of the tool box of FIG. 1A, with the transportation handle in an operative, extended position.

The tool box 10 is fitted with a locomotive arrangement comprising a pair of wheels 26 extending at a bottom, rear end of the base container 14 and a manipulating handle 30 displaceable between a fully retracted position (FIG. 1A) and a fully extracted position (e.g. FIGS. 1B, 2A) facilitating locomoting the tool box 10 by either pulling or pushing thereof over a surface. The substantially large size of wheels 26 facilitates transportation of the tool box also over substantially rough surfaces.

Further noticed, the wheels 26 are positioned such that when the tool box 10 rests over a surface, at least bottom surface segments of the bottom base extend on the contacting the surface, and the surface is tangent to the wheels 26. However, upon tilting of the tool box in a clockwise direction (e.g. by aid of manipulating handle 30) the bottom surface 16 of the tool box disengages from the surface with the wheels 26 being free to rotate over the surface for easy locomotion of the tool box 10. It will be appreciated that the tool box in accordance with present disclosure can be devoid such a locomotive arrangement and or the handle.

The basin-like base container 14 is a rigid structure, typically made of molded plastic material reinforced by a plurality of ribs 19 extending along the side walls and the base 16.

Figure 2A:
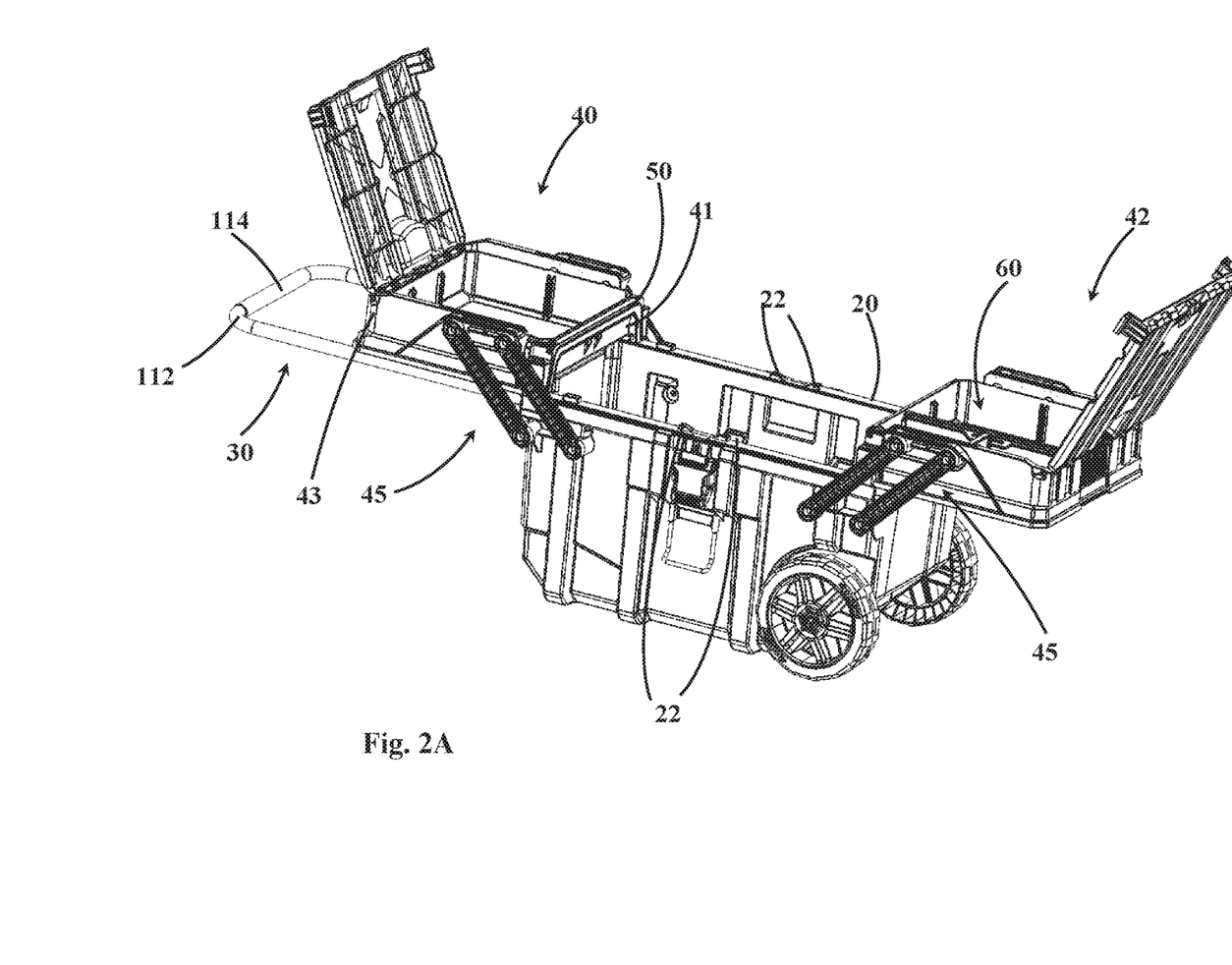
FIG. 2A is a perspective view of the tool box in its open position, allowing full access to the base container thereof.

Displaceably mounted over the top edges 20 of the base container 14, there is a pair of compartmented covers 40 and 42, displaceable between a substantially closed position (FIGS. 1A and 1B) and a fully open position (FIG. 2A). In the closed position, both the compartmented covers 40 and 42 fully extend over the opening of the base container 14 to thereby fully conceal the opening of the base container and prevent access thereto. In the fully open position, the compartmented covers 40 and 42 are fully displaced into their respective open position, fully exposing the base container 14 and allowing access thereto.

Figure 2B:
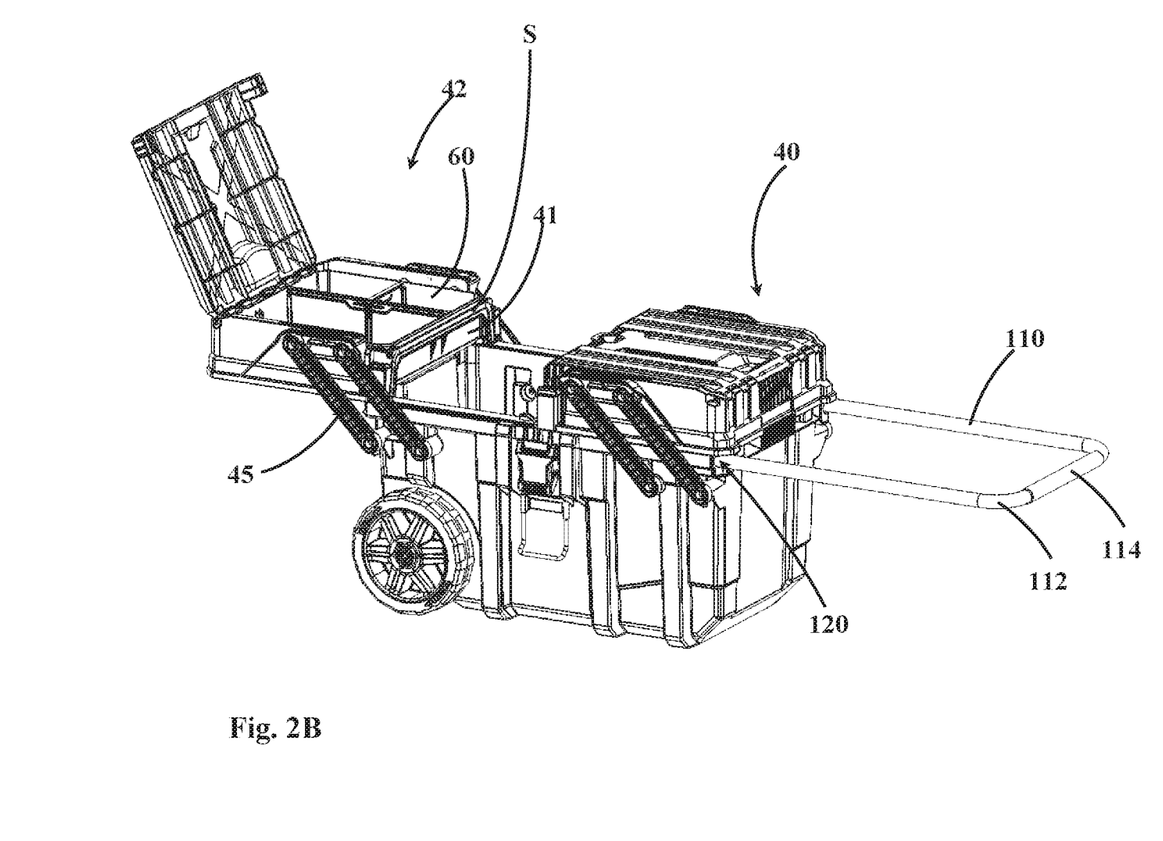
FIGS. 2B and 2C illustrates the tool box of FIG. 2A, with one of its covers in an open position with an open lid.
Figure 2C:
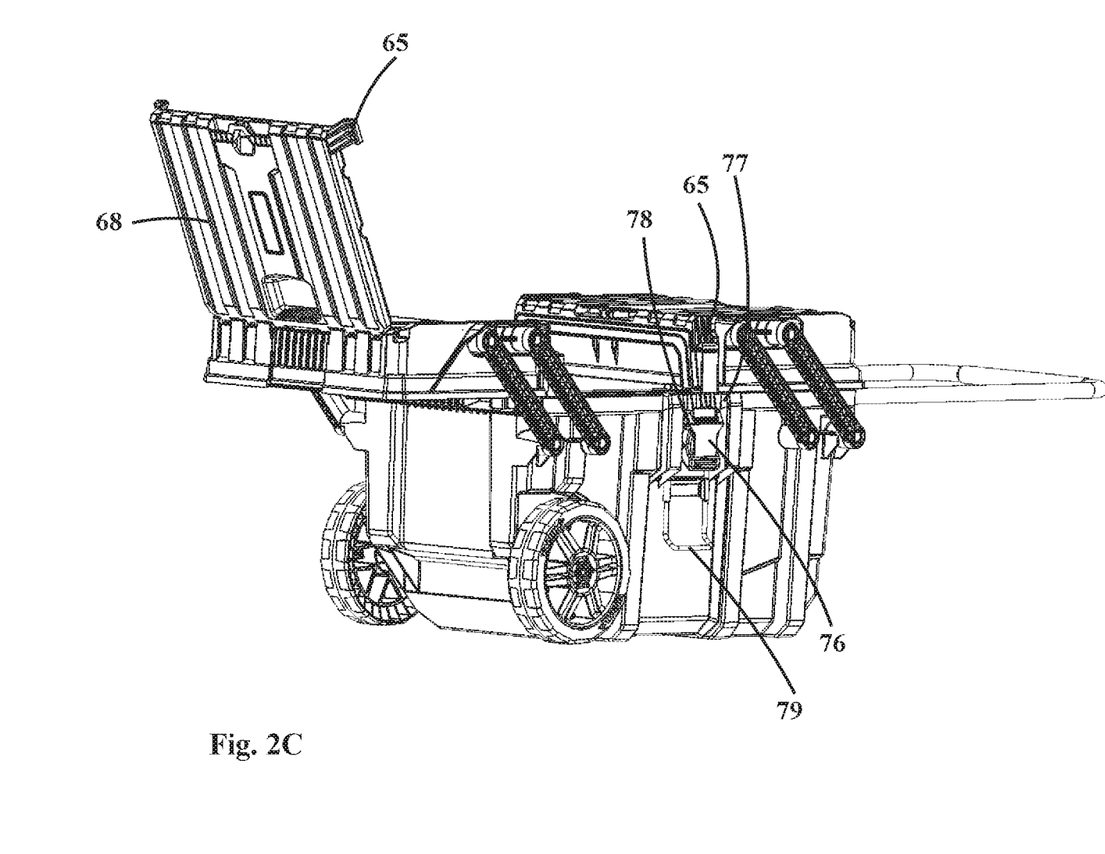

It is appreciated that each of the compartmented covers 40 and 42 may be independently and separately displaceable between the closed and open positions (e.g. FIGS. 2B and 2C). In accordance with an embodiment of this disclosure, the compartmented covers can be harmonically displaced into the respective closed/open positions by means of a retracting/extracting table and pulley system as known in the art. It will also be appreciated that there can be a plurality of compartmentalized covers, together configured for fully concealing/exposing the base container when in the closed/open positions, respectively.

The compartmented covers 40 and 42 are displaceable via a parallel links mechanism 45 associated with each side of each one of the covers (forming a cantilever type displacement). For this, the base container 14 and the respective cover are provided with a pair of pivotable links 46 and 48 constituting the parallel type mechanism 45, whereby the covers can be displaced at least horizontally one away from the other, between the closed and open positions as discussed, however without detaching from the base container. It will be appreciated that other types of engagement and displacement can be provided, e.g. a slider mechanism, for sliding the covers over a rail segment provided on the top edge 20 and/or the respective bottom edge of the cover(s). It will also be appreciated that each one of the covers can be provided with a different, independent, displacement mechanism.

Further appreciated, the compartmented covers 40 and 42 are provided with a plurality of storage bins 60 (for example in compartmented cover 42). Other compartmentalization are further envisioned, e.g. compartmented by displaceable partitioned walls (not shown) fixedly displaceable to thereby give rise to modular sub-compartments in the compartmented drawer cover. Each of the compartmented covers 40 and 42 is fitted with a pivotal lid 68 to secure the contents received there within.

Each of the covers is provided with a free edge 43 and a mating edge 41. When in the closed position, the mating edges of the covers 40 and 42 are proximal one another. When in the open position, the mating edge can extend at any location along the upper edge 20, wherein in the fully open position, best seen in FIG. 2A, the free edge of the cover projects beyond the base container, whilst the mating edge extends about the upper edge of the side wall 18. To prevent unintentional displacement of the covers 40 and 42, the upper edge of the base container is provided with arresting elements 22 configured to lock against a corresponding receiving cavity provided at the bottom surface of the cover edge. This facilitates arresting the covers at their location and can be further used to prevent unintentional movement of the covers towards their fully closed position. Thus this allows a more controlled closing of the covers 40 and 42.

Figure 5:
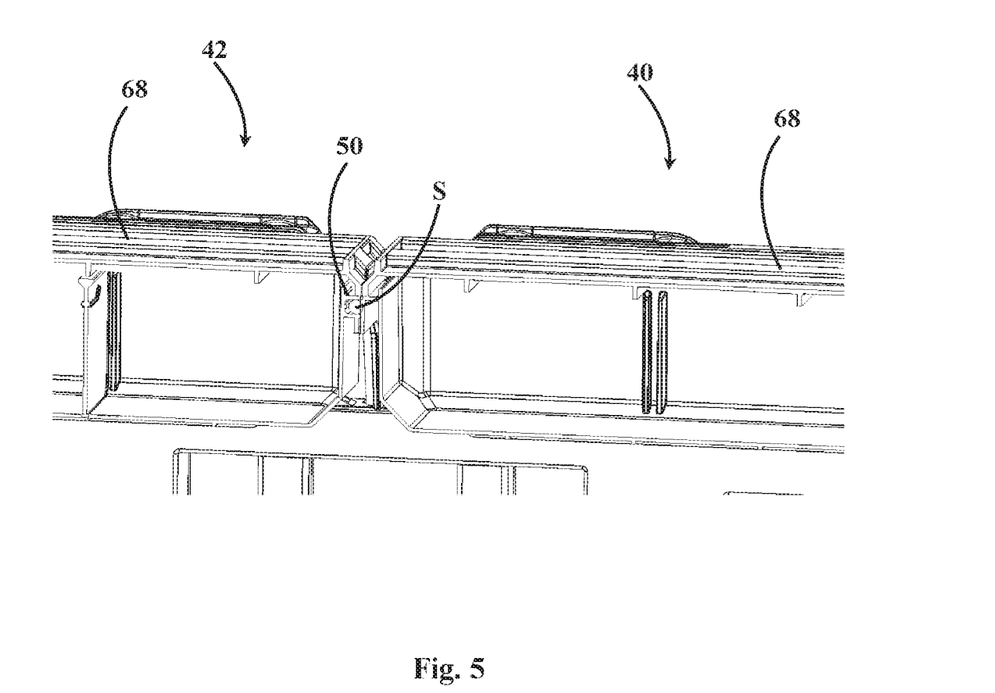
FIG. 5 is a section along line VI-VI in FIG. 1A.

As seen in FIGS. 2B and 2C, the mating edges 41 of the compartmented covers 40, 42 is provided with an elastic seal S at least over one of its sides (in this example at the mating edge 41 of the cover 42) and a respective channel 50 at the opposite mating edge 41 of the second cover 40. When in the closed position, the two covers abut at their mating edge, pressing against the seal S (seen best in the cross section in FIG. 5), thereby providing sealing of the mating edges at the mating points and further allow to correct the dimensions tolerance, if such exists, between the covers. This seal helps to protect the interior space of the tool box against leaks, dust, etc. that might enter the interior of the base container between the cracks. The seal can be made of rubber, silicone polymer, soft plastic and the like. It can be a continuous member as illustrated herein or a non-continuous element. Furthermore, the seal can be injected during the molding process of the covers or can be a detachably attachable element.

Figure 3:
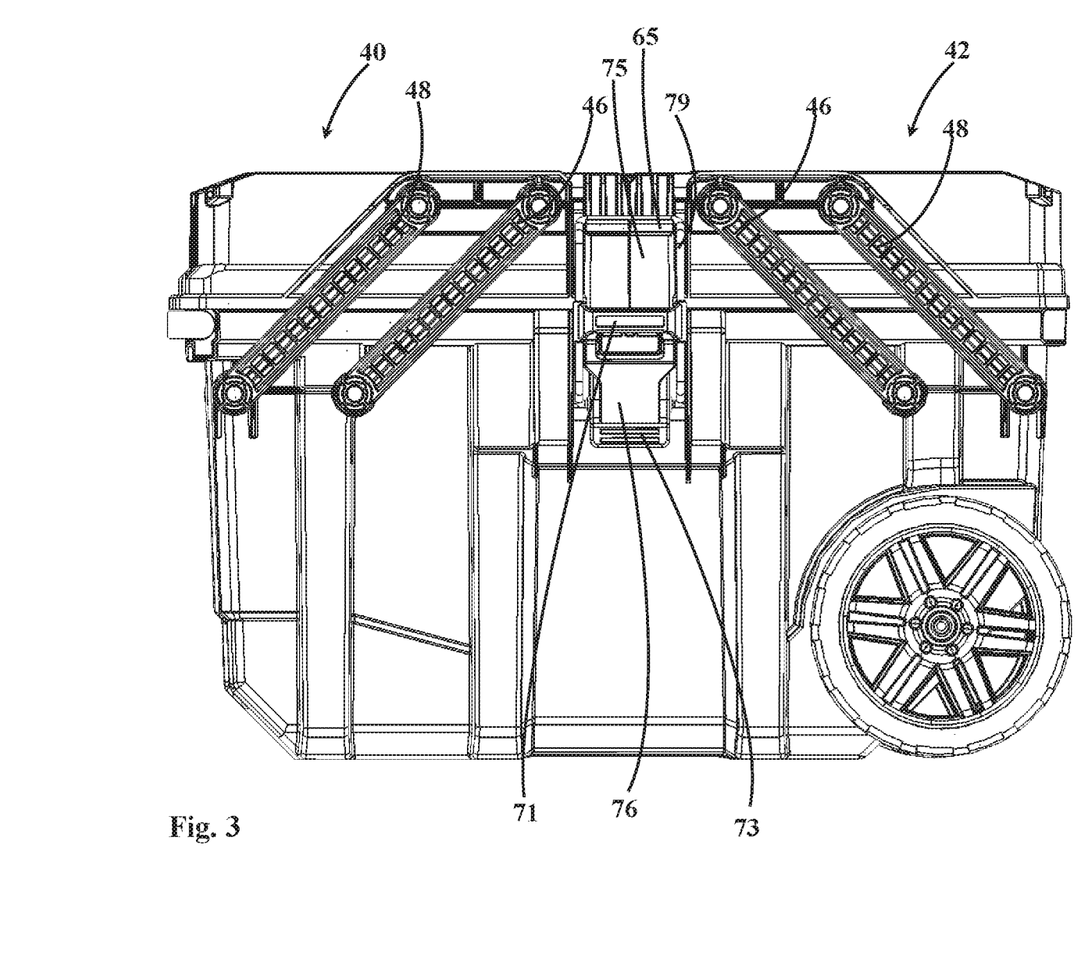
FIG. 3 is a an enlarged side view of the tool box showing the locking arrangement.
Figure 4:
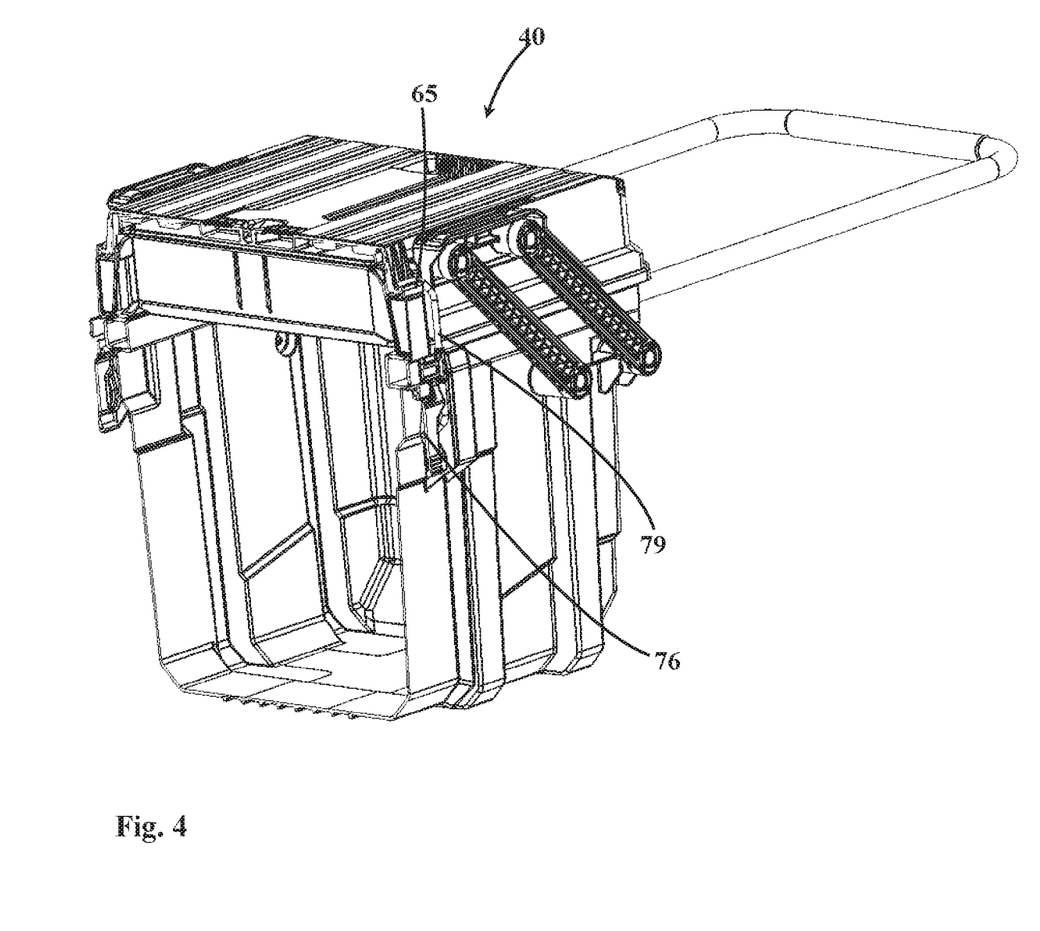
FIG. 4 is a section along line V-V in FIG. 1A.

To lock the compartmented covers in their closed position against the base container, a locking arrangement is provided, generally designated 75, which will be described with reference to FIGS. 2C and 3. In the illustrated example, the locking arrangements are constituted by a toggle latch comprising a hand operated lever 76 pivoted at 78 to a top edge 20 of the base container 14 at the shoulder 77 and loop link 79 pivotably articulated to the opposite end of lever 76. The compartmented covers are each provided with a hook like member 65 provided at the sides of the cover lids 68 (best seen in FIG. 2C) thereof at the mating edges 41 of the cover, such that when in the closed position, the loop link 79 sits over the hook like members 65 and is arrested thereby. To operate the locking arrangement, the lever 76 is pivoted at 78, such that when the lever is pulled away from the base container, the loop link 79 is released from the hook members 65 and the lever 76 can be released to an open configuration (seen e.g. in FIG. 2C); whilst when pressing the lever towards the side wall 18 of the base container, the loop link 79 presses against the hook members 65 and upon reaching the position, it tightens the grip, thereby locking over the hook members 65 and thus locking the two covers with respect to the base container and each other. It will be appreciated that other various latching arrangements can be provided to lock one or both of the covers to the base container and further optionally to each other. The latches can further be provided with a security measures, e.g. locking elements configured to receive a pad lock, or key operated locking arrangement, locking the latch to the tool box (e.g. the base container). This will allow to prevent unauthorized opening of the locking arrangement.

Reverting now to the manipulating handle 30, it is noticed that it is composed of two side bars 110 and an interconnecting grip segment 112 extending therebetween and fitted with a cushioned grip 114. The arms 110 are slidingly displaced within parallel recesses 120 extending along the top edge 20 of the base container wherein the manipulating handle 30 is displaceable between a fully retracted position (FIG. 1A) and a fully extracted position (e.g. FIG. 1B) to facilitate pulling/pushing of the toolbox over the wheels 26. Each side bar 110 includes a stopper (not seen) which prevents it from being pulled completely out of the recesses 120. Typically, the manipulating handle 30 is made of rigid material such as metal, and is configured to bear considerable loads of the toolbox by a suitable moment of inertia. It is appreciated that at the retracted position the handle slightly, if at all, projects from the side walls of the toolbox and however it does not interfere with the smooth sliding displacement of the respective compartmented cover 40.

This design provides sturdy support of the tool box 10 at the upright position, ready to be rolled away over the wheels 26.

It will be appreciated that while the above description was directed towards a transportable toolbox, same features and functions of the compartmented covers and the locking arrangements apply also to toolboxes devoid the locomotive arrangement (wheels) or the retractable handle. While in the above description the locking latches are configured to lock simultaneously both locking covers in unison, it is in accordance with the present disclosure to provide for independent locking mechanisms to lock each of the covers independently. Furthermore, in the event that the tool box is provided with more than a pair of covers, each such cover can be provided with a locking arrangement for secure locking to the base container and to the neighboring cover.

While in the illustrated example, the locking arrangement locks the compartmented cover with the lid 68, it will be appreciated that the lids can be independently securable to the cover and or to the base container and not associated with the locking mechanism locking the covers. In such an embodiment, the cover will be provided with the locking hook member or any respective locking arrangement facilitating locking the cover respective the base container.

Those skilled in the art to which this disclosed subject matter pertains will readily appreciate that numerous changes, variations, and modifications can be made without department from the scope of the disclosed subject matter, mutatis mutandis.

The invention claimed is:

1. A tool box comprising:
 a base container having a base portion and configured with upright extending side walls defining a top opening of the base container, the base and the side walls defining together the container's interior;
 at least two covers displaceable over the top opening of the base container between a closed position where the at least two covers coextend and cover the top opening, and an open position where at least one of the at least two covers is displaced away from an at least one other cover of said at least two covers and at least partially exposes the containers' interior to allow access thereto, each cover of the at least two covers comprising a free edge and a mating edge; and
 at least two locking arrangements extending at an upper portion of the base container, disposed at opposite upright sidewalls of the base container,
 each of the covers having a first hook-like member and a second hook-member, each disposed at said opposite upright sidewalls,
 each of the at least two locking arrangements having a lever-operated loop link, the loop link of one of the at least two locking arrangements being configured for selectively arresting one or both of the first hook-like members, and the loop link of the other one of the at least two locking arrangements being configured for selectively arresting one or both of the second hook-like members; such that when both covers are at the closed position, each of the loop-links is configured for arresting both of the respective hook-like members.

2. The toolbox of claim 1, being configured to be transportable.

3. The toolbox of claim 1, further comprising:
 a locomotive arrangement disposed toward a lower portion of said container assembly; and
 at least one handle for transporting said transportable box on said locomotive arrangement.

4. The toolbox of claim 3, wherein the locomotive arrangement comprises at least one pair of wheels fitted near or at a bottom of the base container and a manipulating handle articulated with the base container.

5. The toolbox of claim 3, wherein the handle is manipulable between a stowed position and a locomoting position, in which it extends from the tool box to facilitate its locomotion.

6. The toolbox of claim 3, wherein a pair of wheels is provided at a bottom side edge of the base container, and the handle is extractable from an opposite top side edge of the base container.

7. The toolbox of claim 3, wherein the handle comprises two side arms interconnected by a grip portion, wherein the side arms are slidably retained along respective top front and rear edges of the base container, and wherein the grip portion is substantially parallel to the respective top side edge such that at the retracted position it is flush with the base container.

8. The toolbox of claim 1, wherein the covers are displaceable by a rail system fitted at the top edges of the base container.

9. The toolbox of claim 1, wherein the covers are displaceable by a parallel link type mechanism, linking each of the covers to the base container.

10. The toolbox of claim 1, wherein the covers are slidably secured to the base container by a pair of drawer-type slides to allow a firm support of the compartmented covers at the fully open position.

11. The toolbox of claim 1, wherein, at the closed position, the covers mate about a center of the base container.

12. The toolbox of claim 1, wherein, at the open position, the covers are fully displaceable from the top opening of the base container, to thereby facilitate full access to the container's interior.

13. The toolbox of claim 1, wherein covers are compartmented covers, optionally provided with lids covering storage compartments therein.

14. The toolbox of claim 13, wherein the respective lids are locked when the compartmented covers are at the closed position.

15. The toolbox of claim 1, wherein at least one of the locking arrangements is configured for receiving a lock to prevent unauthorized opening of the tool box and access to its compartments or interior.

16. The toolbox of claim 1, wherein the locking arrangements are positioned at the mating edges of the covers.

17. The toolbox of claim 1, wherein the covers are further lockable at their top surface one respective the other.

18. The toolbox of claim 1, wherein at least one of the covers is provided at its mating edge with an elastic seal.

* * * * *